(12) United States Patent
Kim et al.

(10) Patent No.: US 6,718,436 B2
(45) Date of Patent: Apr. 6, 2004

(54) METHOD FOR MANAGING LOGICAL VOLUME IN ORDER TO SUPPORT DYNAMIC ONLINE RESIZING AND SOFTWARE RAID AND TO MINIMIZE METADATA AND COMPUTER READABLE MEDIUM STORING THE SAME

(75) Inventors: Chang-Soo Kim, Taejon (KR); Gyoung Bae Kim, Incheon (KR); Bum Joo Shin, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 149 days.

(21) Appl. No.: 10/005,604

(22) Filed: Dec. 7, 2001

(65) Prior Publication Data

US 2003/0023811 A1 Jan. 30, 2003

(30) Foreign Application Priority Data

Jul. 27, 2001 (KR) .......................... 2001-45621

(51) Int. Cl.$^7$ ............................... G06F 13/00
(52) U.S. Cl. ....................... 711/114; 711/170
(58) Field of Search ................. 711/114, 170, 711/112

(56) References Cited

U.S. PATENT DOCUMENTS

| | | | | |
|---|---|---|---|---|
| 5,129,088 A | * | 7/1992 | Auslander et al. ............ 711/1 |
| 5,435,004 A | * | 7/1995 | Cox et al. ................... 711/112 |
| 5,761,526 A | * | 6/1998 | Sakakura et al. ............. 710/1 |
| 5,897,661 A | | 4/1999 | Baranovsky et al. ........ 711/170 |
| 6,574,705 B1 | * | 6/2003 | Peloquin et al. ............. 711/114 |

OTHER PUBLICATIONS

Kim, et al. ; *SANtopia Volume Manager* . . . ; The 3$^{rd}$ *International* Conference on Advanced Communication Tech.; Feb. 2001, p. 625–628.

Kim, et al.; Volume *Management in SAN Environment; Proceedings of the Eighth Int'l Conference* on Parallel and Distributed Systems; Jun. 2001, pp. 500–505.

* cited by examiner

*Primary Examiner*—Glenn Gossage
(74) *Attorney, Agent, or Firm*—Jacobson Holman PLLC

(57) ABSTRACT

A method for managing a logical volume for minimizing a size of metadata and supporting dynamic online resizing and software redundant array of independent disks (RAID), and a computer-readable recording medium storing instructions for embodying the method, are disclosed. The method includes the metadata having a disk partition table containing information of a disk partition in which the metadata is stored; a logical volume table for maintaining the information of the logical volume by storing duplicated information of the logical volume onto all disk partitions of the logical volume; an extent allocation table for indicating whether each extent in the disk partitions is used or not; and a mapping table for maintaining a mapping information for a physical address space corresponding to a logical address space which is a continuous address space equal in size of storage space of whole logical volume.

14 Claims, 6 Drawing Sheets

METHOD FOR MANAGING LOGICAL VOLUME IN ORDER TO SUPPORT DYNAMIC ONLINE RESIZING AND SOFTWARE RAID AND TO MINIMIZE METADATA AND COMPUTER READABLE MEDIUM STORING THE SAME

FIELD OF THE INVENTION

The present invention relates to a method for managing a logical volume for minimizing a size of metadata and dynamic resizing, and a computer-readable recording medium storing a program or data structure for embodying the method; and, more particularly, to a method for managing a logical volume in order to support dynamic online resizing of a logical volume and to minimize the size of metadata managed by the logical volume manager that overcomes a physical limitation of a storage device in computer systems, and a computer-readable recording medium storing a program or data structure for embodying the method.

PRIOR ART

The logical volume manager provides a logical volume which is one virtual disk drive and includes multiple physical disk drives, and implements RAID (Redundant Array of Independent Disks) technique with software to construct the logical volume.

First, RAID and related terms will be explained.

RAID is a way of storing the same data to different locations of multiple hard disks and it is usually utilized in a server with important data. As duplicating and storing the same data to different locations of multiple numbers of hard disks, computing performance is improved by maintaining equilibrium of input/output (I/O) processing and synchronizing input/output processing. Since multiple hard disks increase Mean Time Between Failures (MTBF) and multiple copies of the same data on different locations on the multiple hard disks, fault tolerance of the computer system is also increased despite hard disk malfunctioning.

By placing data on multiple disks, I/O operations can overlap in a balanced way, improving performance. Since the use of multiple disks increases the mean time between failure, storing data redundantly also increases fault-tolerance.

A RAID configuration appears to the operating system to be a single logical hard disk. By utilizing a striping technique in RAID, RAID makes possible varying numbers of partitions within one sector, for example, 512 bytes to several megabytes, on a storage space of hard disks. The stripes of all the disks are interleaved and addressed in order. Striping of all disks may be interleaved and orderly addressed.

In a computer system storing huge data such as a picture in the medical or scientific field, stripes are typically set up to be small size, 512 bytes, so that a single record spans all disks and can be accessed quickly by reading all disks at the same time.

In a multi-user system, better performance requires establishing a stripe wide enough to hold the typical or maximum size record. This allows overlapped disk Input/Output across drives.

There are at least nine types of RAID plus a non-redundant array (RAID-0).

RAID-0: This technique has striping but no redundancy of data. It offers the best performance but no fault-tolerance.

RAID-1: This type is also known as disk mirroring and includes at least two drives that duplicate the storage of data. There is no striping. Read performance is improved since either disk can be read at the same time. Write performance is the same as for single disk storage. RAID-1 provides the best performance and the best fault-tolerance in a multi-user system.

RAID-2: This type uses striping across disks with some disks storing error checking and correcting information. It has no advantage over RAID-3.

RAID-3: This type uses striping and dedicates one drive to storing parity information. The embedded error checking information is used to detect errors. Data recovery is accomplished by calculating the exclusive OR of the information recorded on the other drives. Since an Input/Output operation addresses all drives at the same time, RAID-4 cannot overlap I/O. For this reason, RAID-3 is best for a single-user system with long record applications.

RAID-4: This type uses large stripes, which means records from any single drive may be read. This allows one to take advantage of overlapped Input/Output for read operations. Since all write operations have to update the parity drive, no Input/Output overlapping is possible. RAID-4 offers no advantage over RAID-5.

RAID-5: This type includes a rotating parity array, thus addressing the write limitation in RAID-4. Thus, all read and write operations can be overlapped. RAID-5 stores parity information but not redundant data(but parity information can be used to reconstruct data). RAID-5 requires at least three and usually five disks for the array. It is best for multi-user systems in which performance is not critical or which do few write operations.

RAID-6: This type is similar to RAID-5 but includes a second parity scheme that is distributed across different drives and thus offers extremely high fault- and drive-failure tolerance. There are few or no commercial examples currently.

RAID-7: This type includes a real-time embedded operating system as a controller, caching via a high-speed bus, and has other characteristics of a stand-alone computer. One vendor offers this system.

RAID-10: This type offers an array of stripes in which each stripe is a RAID-1 array of drives. This offers higher performance than RAID-1 but at much higher cost.

RAID-53: This type offers an array of stripes in which each stripe is a RAID-3 array of disks. This offers higher performance than RAID-3 but at much higher cost.

Disk striping will now be explained.

Striping is the process of dividing logically continuous data segments such as a single file and storing the divided segments into physically separated devices such as disk drives using a round robin technique. If a processor has the ability to write and read data faster than to receive and apply data from/to a single disk, striping is a useful technique.

Data is divided into unique sized bytes or sectors and stored over several drives. For example, if there are four drives designed to operate with overlapping read/write operation, generally, four sectors can be read in the same time of reading one sector.

Disk Striping is not provided for fault tolerance or error checking but it can be used for such functions with other techniques.

Striping can be used with mirroring.

Mirroring is a process for duplicating and storing data to more than one device for preventing damaged data in case of malfunctioning devices.

It can be embodied in hardware or software. A RAID system generally has a mirroring function. Operating systems including the Novell Network operating system provide disk mirroring as software. If mirroring is applied to a magnetic tape storage system, it is usually called twinning. Another method, which is cheaper than mirroring, for minimizing data damage is backing up data to magnetic tape at fixed periods.

Based on the above-mentioned terms, the pre-existing technique will be explained in the following paragraphs.

Currently, storage devices with hardware RAID are used for providing better performance, fault tolerance, data recovery from disk error, and to overcome limitations of disk drive size. Such a hardware RAID device has several advantages but it also has an important disadvantage. It is too expensive.

Moreover, it is physically impossible to connect a large number of disk drives as one device so a hardware RAID device also has a limitation of possible applicable storage space.

For overcoming the foregoing problems of the hardware RAID device, a logical volume manager that implements software RAID, has been developed. The logical volume manager is an intermediate level block device driver implementing the various RAID techniques in software based on the calculating ability of a computer, and treats several physically separated independent disk drives as one disk drive.

Pre-existing logical volume managers have been using a fixed mapping method that uses a fixed convert function in converting the logical address used by a high-level module, such as in file systems and general data managers, to a physical address of several underlying physical disk drives. This method has a limitation in flexibility since it fixes the relationship between logical address and physical address. Therefore, it has a problem accepting frequently requested services such as online resizing when using storage space.

Some logical volume managers don't use a mapping function when a logical address is mapped to a physical address, but use a table-based method for mapping a logical address to physical address.

However, conventional logical volume managers have problems in that metadata is too large to manage in huge storage structures and processing speed is too slow when modifying metadata. Also, for managing a logical volume, the huge size of metadata delays system booting time and uses too much memory.

Baranovsky et al. teaches a logical volume manager that provides logical storage space without limitation of physical storage device in U.S. Pat. No. 5,897,661 under the title of "Logical volume manager and method having enhanced update capability with dynamic allocation of storage and minimal storage of metadata information". However, the Baranovsky et al. patent has problems of having too much metadata, delaying processing speed, delaying system-booting time, and using too much memory.

The Baranovsky et al. patent uses storage space information, which is located on a memory when a system is booting and is for putting the information to memory, for every process when conversion of a physical address to a logical address has to be performed. Therefore, the Baranovsky et al. patent has problems of having too much metadata, delaying system-booting time, and using too much memory.

SUMMARY OF THE INVENTION

It is, therefore, an object of the present invention to provide a logical volume manager for managing a logical volume using a mapping table storing a relation between a physical address and a logical address, using a minimum space for metadata and supporting online dynamic resizing.

It is also another object of the present invention to provide a computer-readable recoding medium storing a program or data structure for embodying the method.

In accordance with an aspect of the present invention, there is provided a method for managing a logical volume in order to support dynamic online resizing and minimizing a size of metadata, the method including the steps of: a) creating the logical volume by gathering disk partitions in response to a request for creating the logical volume in a physical storage space; b) generating the metadata including information of the logical volume and the disk partitions forming the logical volume and storing the metadata to the disk partitions forming the logical volume; c) dynamically resizing the logical volume in response to a request for resizing, and modifying the metadata on the disk partitions forming the logical volume; and d) calculating and returning a physical address corresponding to a logical address of the logical volume by using mapping information of the metadata containing information of the physical address corresponding to the logical address.

Also, the present invention, in a storage system with a processor, is directed to providing a computer-readable recording medium storing a program or data structure for embodying the method and comprises functions for: a) creating a logical volume by gathering disk partitions in response to a request for creating the logical volume in a physical storage space; b) generating the metadata including information of the logical volume and the disk partitions forming the logical volume and storing the metadata to the disk partitions forming the logical volume; c) dynamically resizing the logical volume in response to a request for resizing, and modifying the metadata on the disk partitions forming the logical volume; and d) calculating and returning a physical address corresponding to a logical address of the logical volume by using mapping information of the metadata containing information of the physical address corresponding to the logical address.

The present invention maintains a mapping table separately without using a fixed mapping function when a logical address, which is used by a file system, a database and/or a data managing system for overcoming problems of currently used RAID systems, is mapped to the physical address of a real physical disk drive corresponding to the logical address.

By providing flexibility of mapping, volume size can be dynamically increasing and decreasing effectively while operating a system and a RAID level of the volume can be applied to a newly added storage space.

Also, operations for metadata modification can be performed effectively by minimizing necessary metadata for managing a logical volume, and memory can have more space for other operations based on minimized metadata.

The present invention manages a logical volume by using minimum space for system metadata and modifies metadata by using minimum processing overhead. The present invention can also modify metadata with simple operation, manage huge storage, and provide various functions including on-line resizing, in response to a user's request, during system operation.

Also, the present invention can provide information on another disk despite malfunctioning of one of the physical disks. The information includes not only normal information but also system managing information. The present invention also warns users when one of the devices is unavailable for use because of error.

The present invention provides a dynamic mapping method for modifying mapping between a logical address used in a high-level module and a physical address of a physical disk device as needed. Also the present invention minimizes the size of metadata including mapping table information needed for managing a logical volume. Additionally, the present invention minimizes the modifying request on the metadata and then can support various online management functions including a resizing request occurring during use of the storage space with minimum cost. By minimizing the size of metadata managed in a memory while the system is operating, the present invention can manage a super huge storage system.

Additionally, in a malfunction situation in a disk of physical devices managed together logically, a requested operation for another physical disk can be serviced continuously.

BRIEF DESCRIPTION OF DRAWINGS

The above and other objects and features of the present invention will become apparent from the following description of the preferred embodiments given in conjunction with the accompanying drawings, in which.

PREFERRED EMBODIMENTS OF THE INVENTION

Other objects and aspects of the invention will become apparent from the following description of the embodiments with reference to the accompanying drawings, which is set forth hereinafter.

Figure 1:
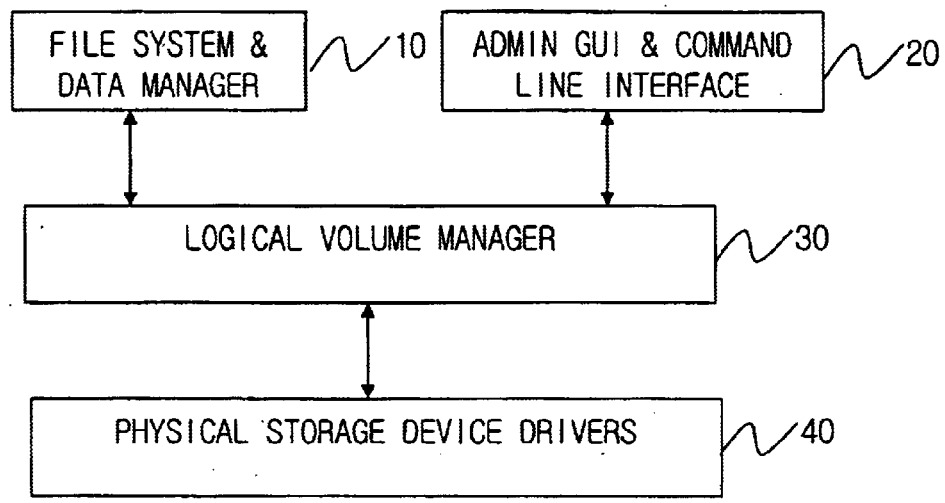
FIG. 1 is a diagram of a computer system utilizing the present invention.

FIG. 1 is an illustration of a computer system utilizing the present invention.

FIG. 1 illustrates an interface between a logical volume manager, physical storage devices, and high-level services, in accordance with a preferred embodiment of the present invention.

A useful environment for the present invention includes a computer, several disk drive devices and a line connecting the computer and the disk devices. There is no limitation for connection between the computer and disk drive devices. However, the computer may directly connect to disk drive devices or connect to a network including disk drive devices.

As shown in FIG. 1, the computer contains device drivers (physical storage device drivers 40) for operating disk drive devices in an operating system.

The logical volume manager 30 is a virtual intermediate level device driver located above a variety of physical device drivers 40, uses services of physical device drivers, and is included in an operating system of the computer.

A file system and data manager or traditional data manager 10 performs operations on a logical volume serviced by the logical volume manager 30. An administration graphical user interface (admin GUI) and command line interface 20 are tools to perform managing operations on the logical volume by using functions provided by the logical volume manager.

Figure 2:
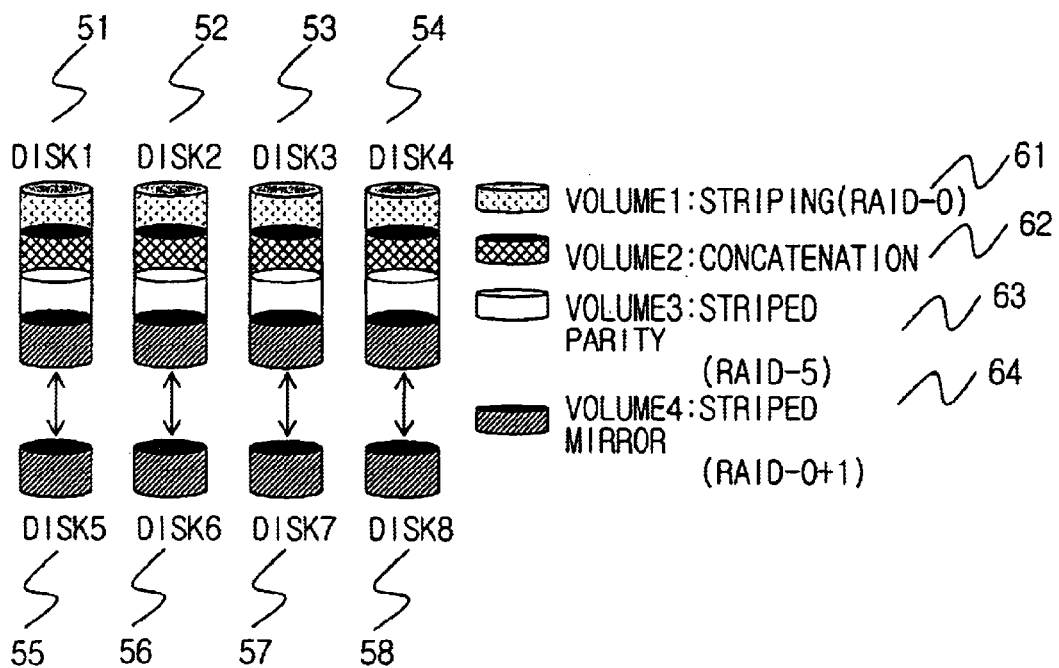
FIG. 2 is a view of a logical volume in accordance with a preferred embodiment of the present invention.

FIG. 2 is a view of a logical volume that may be constructed by the present invention in accordance with a preferred embodiment of the present invention, and shows possible logical volumes generated by the logical volume manager in an embodiment of eight disk drives. Disks 1, 2, 3, 4 are divided into four partitions and disks 5, 6, 7, 8 have one partition. Disks can be divided into partitions using a tool or utility applied by an operating system. For example, such a tool is "FDISK".

Volume 1 61 includes the first partition of disks 1, 2, 3, 4 and has striping construction, RAID level 0.

Volume 2 62 includes the second partition of disks 1, 2, 3, 4 and has concatenation construction.

Volume 3 63 includes the third partition of disks 1, 2, 3, 4 and has RAID level 5 construction.

Volume 4 64 includes the fourth partition of disks 1, 2, 3, 4 and the whole partition of disks 5, 6, 7, 8, and has a combined construction with striping and mirroring, RAID level 0+1.

There can be three possible virtualizations of storage, in accordance with a preferred embodiment of the present invention.

The first virtualization is a disk partition or physical partition. As described above, the disk partition is generated by an operating system's tool or utility. The disk partition is a minimum unit of the logical volume. A logical volume includes more than one disk partition. Therefore, a size of the logical volume is resized in disk partition units.

The second virtualization is the logical volume. The logical volume is a union of disk partitions and is extensible. It is named and provides continuous address space. The logical volume can be resized while the system is operating.

The third virtualization is an extent. The extent is continuous space having the same size. It is also a minimum unit of space allocation to store information. The size of an extent is fixed with each logical volume and it is decided at the creation of the logical volume. The size has to be an exponent of two.

Figure 3:
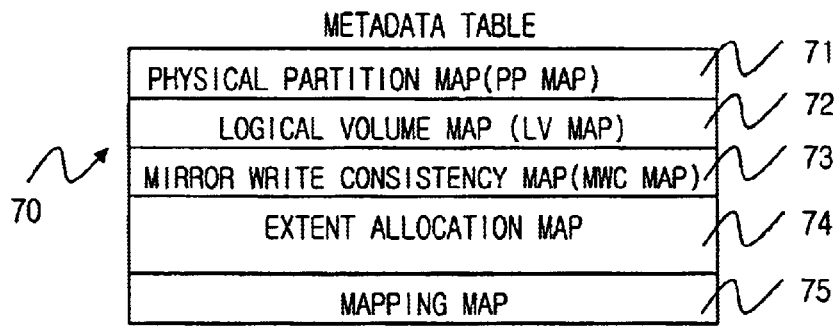
FIG. 3 is a structural diagram of a metadata table used in conjunction with a method for managing the logical volume in accordance with a preferred embodiment of the present invention.

After a disk partition is created using an operating system's tool or utility, a logical volume is constructed with several disk partitions. At this point, information for constructing a volume is also considered. The information includes a size of the extent and a RAID level. The logical volume manager records a metadata about the volume construction in corresponding disk partitions. FIG. 3 is a structural chart of a metadata table used in a method for managing the logical volume, in accordance with a preferred embodiment of the present invention. It is a view illustrating the metadata table stored in each disk partition constructing one logical volume. It shows the metadata table 70 maintained and stored in each disk partition constructing one logical volume.

Metadata in the metadata table includes a Physical partition map, PP map 71, a logical Volume map, LV map 72, a mirror write consistency map, MWC map 73, an extent allocation map 74, and a mapping map 75.

In the metadata table 70, metadata for a whole volume is duplicated and stored in each disk partition. The metadata is the logical volume map, LV map 72. Metadata except logical volume LV map 72 is data for each local disk partition and it is stored only in a corresponding disk partition.

The mirror write consistency map 73 is maintained only when the logical volume is constructed by mirror type and it is duplicated and stored at each mirror. For example, if disk partition 1 and disk partition 2 are mirrored, then MWC map 73 of the disk partition 1 is duplicated as MWC map 73 of the disk partition 2. It is used for maintaining precise information when a malfunction occurs in one of the mirrored disk partitions.

The Mapping map 75 of a disk partition itself is duplicated and stored to a succeeding disk partition among disk partitions forming the logical volume. It is also for overcoming unavailability of information in case of disk partition error.

Each metadata will be explained in detail in the following paragraphs. The PP map 71 and the LV map 72 will be explained with reference to FIGS. 4 and 5 and the Mapping Map 75 will be explained with reference to FIG. 6 and FIG. 9.

The MWC map 73 of FIG. 3 is constructed with three bits per one extent when mirror data is two (there are two mirrors) Therefore, the first three bits are about the first extent. The first bit is validity of original data, the second bit is validity of the first mirror data, and the third bit is validity of the second mirror data.

As an example, the first mirror of disk partition 1 is disk partition 2, and the second mirror is disk partition 3. The first bit of MWC map 73 is validity of the first extent of the disk partition 1, the second bit is validity of the first extent of the disk partition 2, and the third bit is validity of the first extent of the disk partition 3. The fourth bit is validity of the second extent of the disk partition 1.

The MWC map 73 is duplicated and stored at disk partitions 1, 2 and 3. It is for verifying validity even if any one or two of the disk partitions 1, 2, 3 malfunction(s).

The extent allocation map 74 of FIG. 3 uses one bit per each extent in the disk partition and it represents usage of a corresponding extent.

The extent allocation map 74 is duplicated and stored in corresponding disk partitions for correcting local error in an extent allocation map of a corresponding disk partition.

Figure 4:
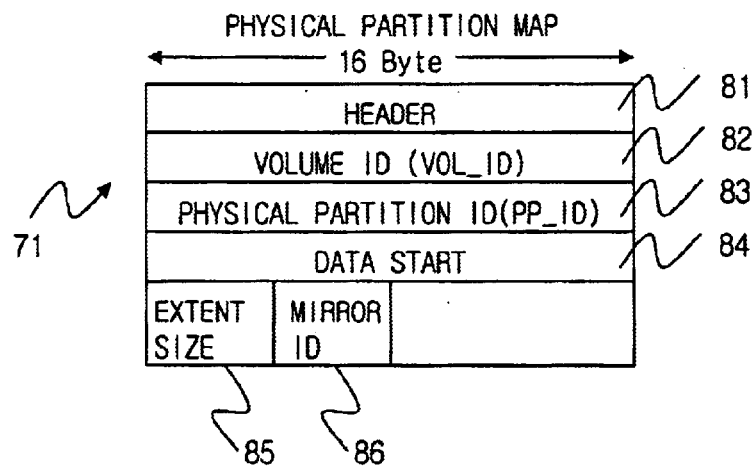
FIG. 4 is a structural diagram of a physical partition (PP) map in the metadata table in accordance with a preferred embodiment of the present invention.

FIG. 4 is a structural chart for a PP map in the metadata table, in accordance with a preferred embodiment of the present invention, and shows the physical partition Map 71 shown in FIG. 3 in detail. The PP Map 71 contains information on corresponding disk partitions.

As shown in FIG. 4, the PP Map 71 includes a 16 byte Header 81, a Volume_ID 82 for a logical volume formed by the disk partition, PP_ID 83 for identifying itself in the logical volume, a Data Start 84 for representing a real data start point except the metadata table in the disk partition, an Extent Size 85 arranged for the logical volume containing the partition, and a Mirror ID 86 for representing its role for mirroring, if the logical volume containing the partition has a mirror type.

The Mirror ID has 0, if it has original data. The Mirror ID is 1, if it has the first mirror data. The Mirror ID is 2, if it has the second mirror data. Therefore, the PP_ID represents the order of corresponding PP locations in the logical volume and the Mirror ID has a role when the order is the same.

The PP Map is stored only in corresponding disk partitions because it manages information of its disk partitions.

Figure 5:
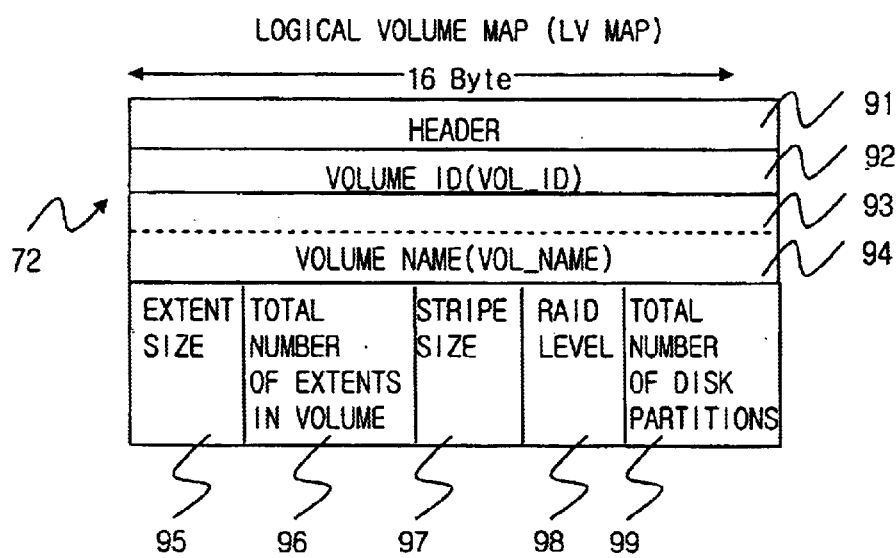
FIG. 5 is a structural diagram of a logical volume (LV) map in the metadata table in accordance with a preferred embodiment of the present invention.

FIG. 5 is a structural chart of a LV map in the metadata table, in accordance with a preferred embodiment of the present invention, and illustrates the Logical Volume Map 72. It contains information about one logical volume and is duplicated and stored in all the disk partitions having the corresponding logical volume.

As shown in FIG. 5, the Logical Volume Map 72 includes a 16 byte Header 91, a VOL_ID 92 generated by the logical volume manager for identifying the logical volume, a VOL_NAME 93 named when the logical volume is created, an Extent Size 95 being a minimum space allocation unit of a corresponding volume, a Total # of Extents 96 being total number of extents in a corresponding volume, a Stripe Size 97 for representing a size of a stripe in case a corresponding volume has striping type, a RAID Level 98 for representing the constructing type of a corresponding volume, and the Number of disk partitions 99 being the total number of disk partitions constructing a corresponding volume. The Extent Size 95 must be a power of 2.

The PP Map and LV Map can be combined as one with commonly stored information. But, in accordance with a preferred embodiment of the present invention, it is divided into the PP Map and LV Map for helping understanding the present invention logically. Combining PP Map and LV Map can be preferred for embodying the present invention.

Figure 6:
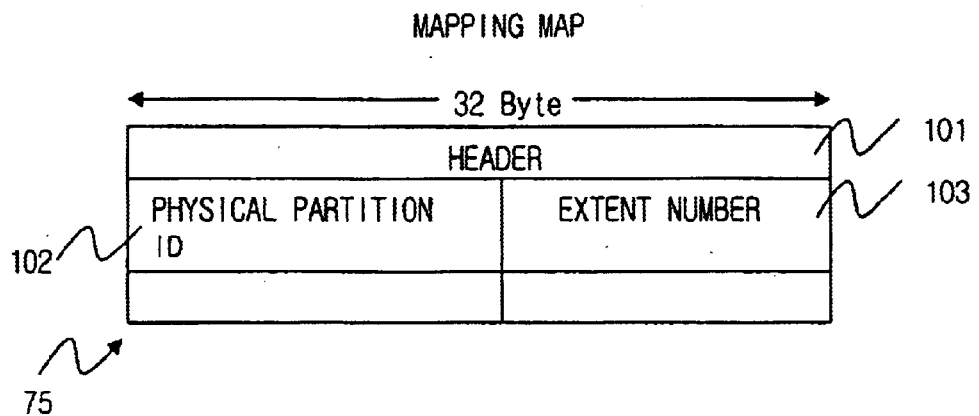
FIG. 6 is a structural diagram for a Mapping Map in the metadata table in accordance with a preferred embodiment of the present invention.
Figure 7:
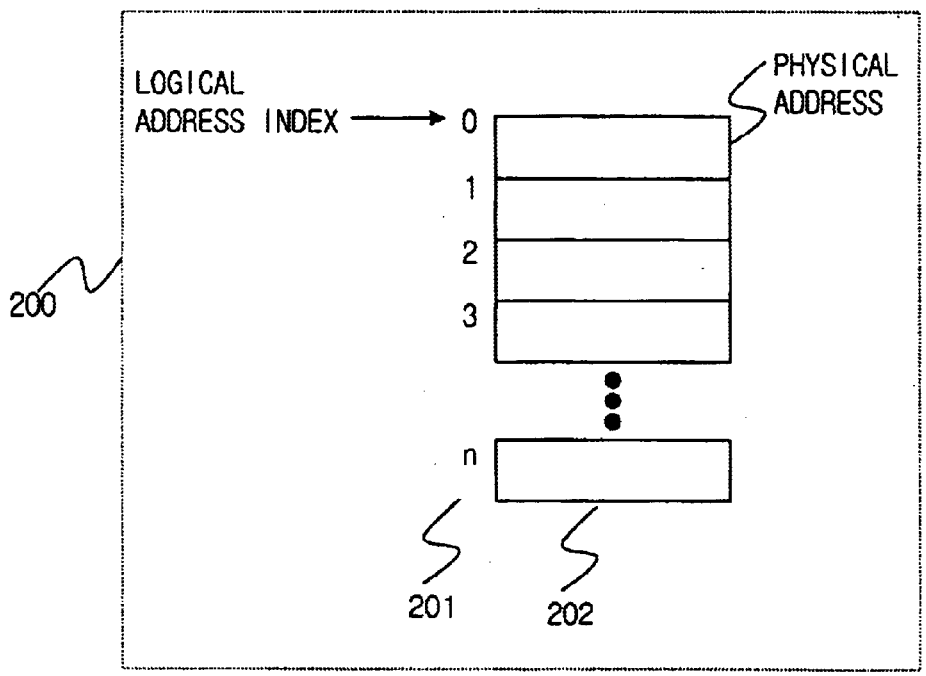
FIG. 7 is a logical structural diagram for a Mapping Map in the metadata table in accordance with a preferred embodiment of the present invention.

FIG. 6 is a structural chart for a Mapping Map in the metadata table, in accordance with a preferred embodiment of the present invention. FIG. 7 is a logical structural chart for a Mapping Map in the metadata table, in accordance with a preferred embodiment of the present invention.

Referring to FIG. 6, the Mapping Map 75 includes a Header 101, and a pair of PP ID 102 and Extent Number 103 per each extent for continuous logical address space of the logical volume. A size of the Mapping Map is decided by the size of a corresponding disk partition and the Extent Size.

Mapping Maps of all disk partitions constructing one logical volume have logical construction 200 shown in FIG. 7. A logical address space used in a high-level module is a continuous address space equal to the possible storage space of the whole volume.

For example, if a logical volume has striping type and includes three disk partitions, then entries of the Logical Mapping Table in FIG. 7 will be constructed such that each entry is for one of the disk partitions in rotating sequence. So, an index 0 contains an address of an extent existing in the first disk partition. An index 1 contains an address of an extent existing in the second disk partition. An index 2 contains an address of an extent existing in the third disk partition. An index 3 contains an address of an extent existing in the first disk partition again.

The above-mentioned mapping table is divided into the number of disk partitions forming a corresponding logical volume and each divided part is stored in each disk partition. Various methods can be used for dividing the above-mentioned mapping table but here, an orderly dividing method will be explained.

If the total number of Extents of a logical volume is 300, the number of disk partitions forming the logical volume is 3, and the size of each partition is equal, then the Logical Address Index 201 of FIG. 7 has a range of 0~299. At this point, the Mapping Map in disk partition 1 has the Logical Address Index of 0 through 99. The Mapping Map in disk partition 2 has the Logical Address Index of 100 through 199 and the Mapping Map in disk partition 3 has the Logical Address Index of 200 through 299.

Figure 8:
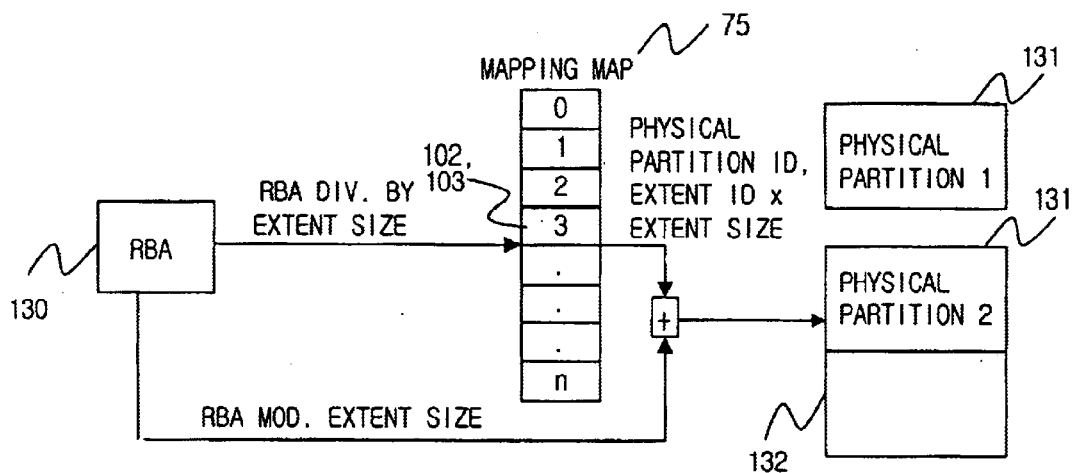
FIG. 8 is a diagram showing a mapping relation between a logical address and a physical address through the mapping map in accordance with a preferred embodiment of the present invention.

FIG. 8 illustrates a mapping relation between a logical address and a physical address through the mapping map, in accordance with a preferred embodiment of the present invention. In detail, FIG. 8 shows steps for converting a Relative Block Address of a logical volume to a physical address in a real disk partition by using the Mapping Map. In other words, FIG. 8 shows a method to calculate the physical location of corresponding data for a logical address, such as a relative block address (RBA), used in a file system or database system.

The Logical Address Index 201 is calculated by dividing the RBA 130 by the Extent Size. A location in the Mapping Map is decided by the Logical Address Index.

The Mapping Map represents a location of a corresponding Extent as the PP_ID 102 and the Extent Number 103. The PP_ID identifies a disk partition containing corresponding Extent and {(Extent Num×Extent Size)+(RBA mod Extent Size)} represents the data block location in a corresponding disk partition.

Figure 9:
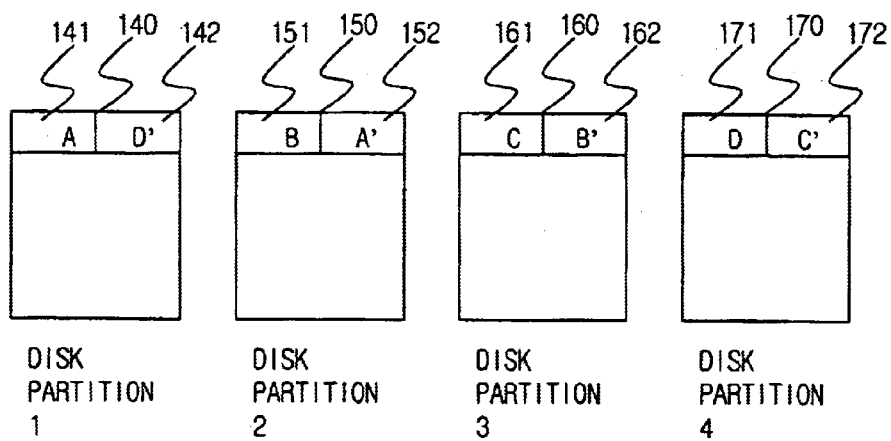
FIG. 9 is a diagram showing dividing the Mapping Map and storing the divided Mapping Map into each disk partition, in accordance with a preferred embodiment of the present invention.

FIG. 9 illustrates a method to divide the Mapping Map and store the divided Mapping Map into each disk partition, in accordance with a preferred embodiment of the present invention. FIG. 9 shows a view of dividing the Mapping Map and storing the divided Mapping Map into disk partitions 140, 150, 160, and 170, which form the logical volume. Mapping information is very important for the logical volume so it is necessary to duplicate information of the Mapping Map in order to resolve the problems arising in case of errors in a physical location containing the information.

The information of the Mapping Map is not dependent to a corresponding disk partition. The information of the Mapping Map stored in one disk partition contains not only information of a corresponding disk partition but also information of other disk partitions.

Duplicating the information within the same disk partition is useless for recovering from errors. Therefore, in the present invention, information 141, 151, 161, 171 of the Mapping Map stored in one disk partition is duplicated and stored as information 142, 152, 162, 172 into the next disk partition. By doing so, in case of a disk partition error, the information can be accessed by using the information duplicated and stored in the next disk partition.

Figure 10:
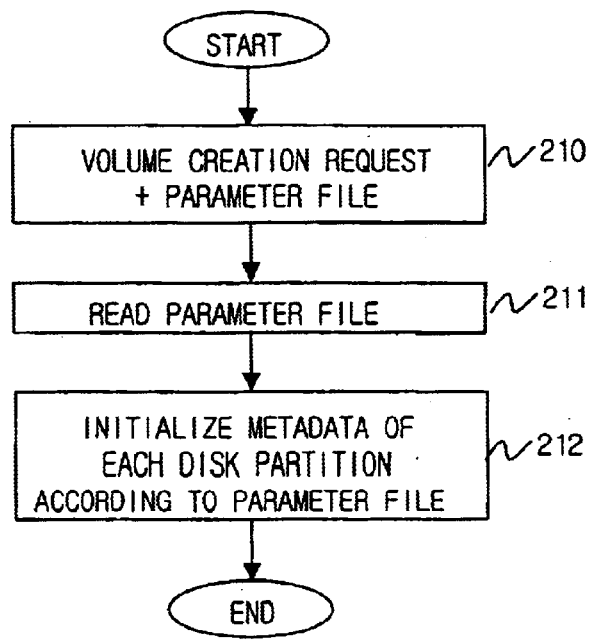
FIG. 10 is a flowchart illustrating a volume creation procedure of a volume management method in accordance with a preferred embodiment of the present invention.

FIG. 10 is a flowchart of management steps when a volume is created, in accordance with a preferred embodiment of the present invention, and shows the steps of creating a new volume by the logical volume manager.

As shown in FIG. 10, at first, a system manager requests creation of a volume with a Parameter file in step 210. Then, the logical volume manager reads the Parameter file in step 211. The logical volume manager initializes and stores a metadata table of each disk partition used to construct the logical volume according to the Parameter file in step 212. By the above-mentioned steps, a new volume is created.

Figure 11:
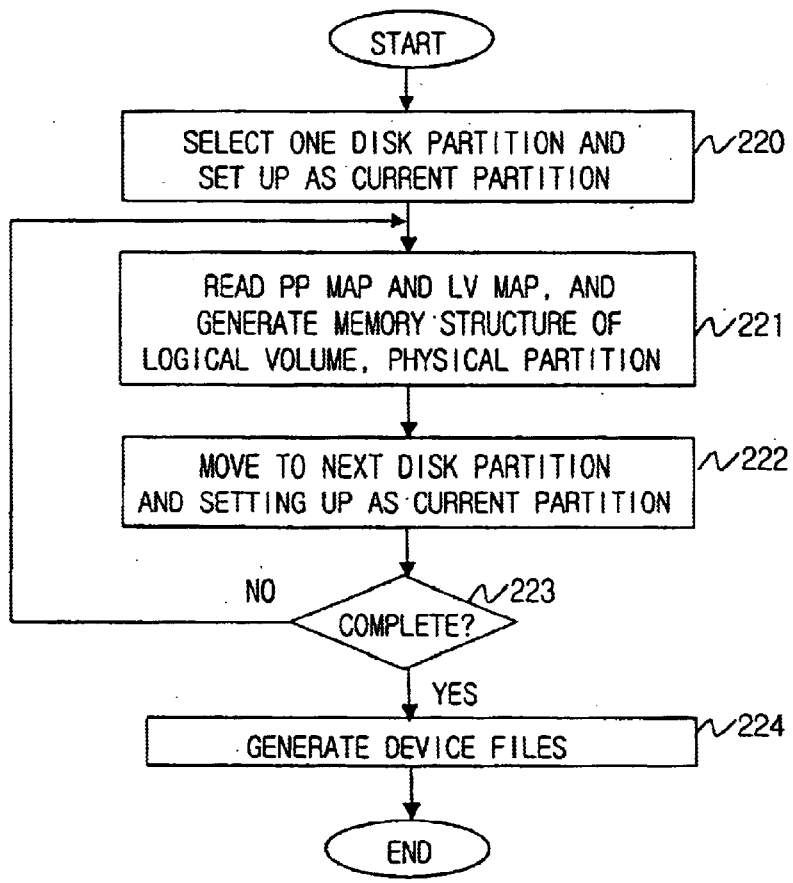
FIG. 11 is a flowchart illustrating a procedure for initializing device file in the system by initializing a logical volume in accordance with a preferred embodiment of the present invention.

FIG. 11 is a flowchart of the steps for recognizing of volumes and generating a device file for each volume in the system in accordance with a preferred embodiment of the present invention.

In detail, FIG. 11 shows steps for recognizing created or pre-existing volumes and generating a device file for each recognized volume in a system after the system boots or when a manager requests.

First, one of the disk partitions registered in the system is selected and it is set up as a current partition in step 220. The current partition is a variable.

Second, the PP Map 71 and the LV Map 72 stored in the disk partition, which is set up as the current partition, are read, and necessary information structure in a memory is generated for the logical volume or physical partition in step 221. However, if the disk partition is not a partition managed by the logical volume manager; then a step for generating necessary information structure in the memory can be omitted.

Third, the method moves to a next disk partition in the system which is set up as the new current partition in step 222, and it is determined whether all disk partitions in the system have been examined in step 223.

If all disk partitions have been examined, then device files representing corresponding logical volumes are generated in the system, step 224. If unexamined disk partitions remain, then the process goes to the second step 221.

Figure 12:
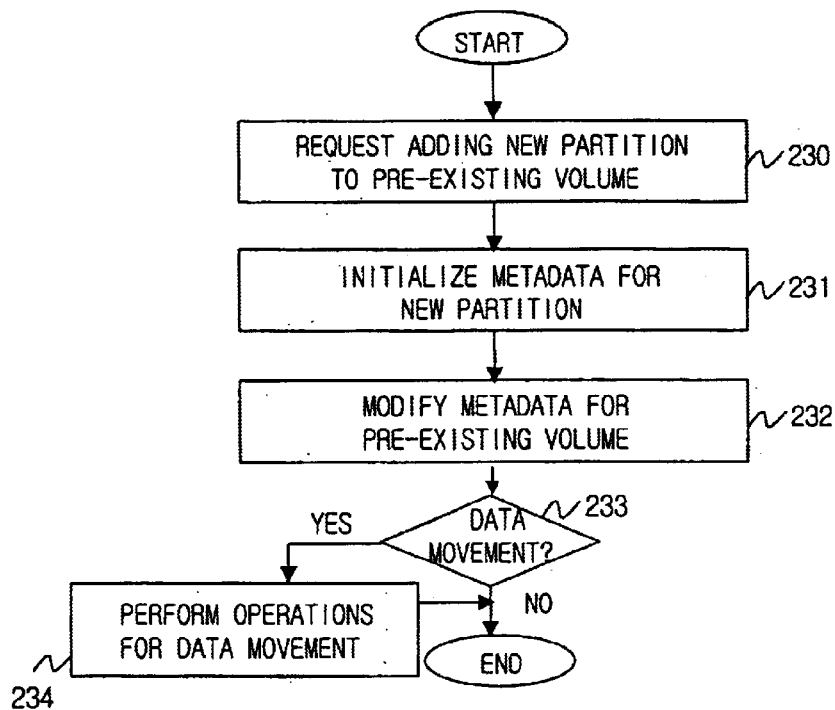
FIG. 12 is a flowchart showing a procedure for increasing a size of an existing logical volume by adding new disk partitions, in accordance with a preferred embodiment of the present invention.

FIG. 12 is a flowchart for showing steps of increasing the size of an existing logical volume by adding new disk partitions, in accordance with a preferred embodiment of the present invention, and shows steps for adding more than one new disk partition to the volume for increasing the size of the logical volume.

If a system manager requests adding more than one disk partition (step 230), then the logical volume manager initializes a new partition by creating a metadata table for the new partition and writing the metadata table in a corresponding partition, step 231.

After that, the logical volume manager modifies the metadata table for a pre-existing volume of disk partitions, which are already forming the logical volume and the metadata is reflected to a disk, step 232. Then, the necessity of data movement for adding new disk partitions is determined in step 233. The necessity of data movement will be explained with reference to FIG. 13.

In the step 233 of FIG. 12 for determining the necessity of data movement, if it is necessary to move data, then the existing data is moved, using a RAID level to the whole volume including a new disk in step 234. When moving data is completed or is not necessary, the process is completed. During these steps, general accessing operations to a corresponding logical volume are not disturbed and are processed at the same time. Since all movement of data is being tracked and maintained by managing the Mapping Map separately, general data accessing processes can be performed continuously during data movement.

Figure 13:
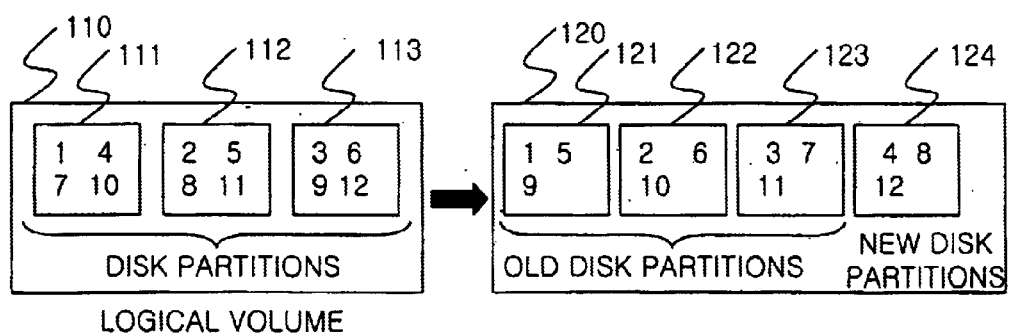
FIG. 13 illustrates re-arrangement of data, which is generated during adding of a disk partition to a logical volume, in accordance with a preferred embodiment of the present invention.

FIG. 13 illustrates re-arranging data, which can arise during adding a disk partition to a volume, in accordance with a preferred embodiment of the present invention, and shows re-arrangement of the data, which can arise during adding a disk partition to a volume having striping type, which is RAID-0.

FIG. 13 shows a case of resizing a volume 110 where an original volume includes disk partitions 111, 112, 113 and has striping configuration (RAID 0), and a new disk partition 124 is added to the volume 110 or 120 in order to increase the capacity. The logical volume 120 contains one more partition 124 than the original logical volume 110.

Since the configuration type of the volume is striping, pre-existing data has to be re-distributed to four disk partitions including disk partition 124. In all RAID levels including striping, the effect of striping has to be reflected to the newly added disk partition. Such a data re-arrangement can increase I/O performance by expanding effect of striping to all disk partitions.

The present invention can provide two methods: one method is to expand the RAID level to whole disk partitions including the new disk partition, and the other method is to expand the RAID level to whole disk partitions only on newly inserted data after the addition of new disk partition(s). In the latter method, data re-arrangement is not needed. Only newly inserted data are distributed considering the newly added disk partition(s).

In the former method, pre-existing data have to be re-distributed into whole disk partitions including newly added disk partition(s).

The present invention has an ability to select and use a method between the two methods.

The above-mentioned method of the present invention can be stored in a computer readable medium including compact disc read only memory (CDROM), random access memory (RAM), floppy disk, hard disk, and magneto-optical disk.

In accordance with a preferred embodiment of the present invention, a logical address used in a higher level of a logical volume manager and a physical address of real physical disk partitions can be managed independently by using the Mapping table, and the mapping relation can be re-constructed dynamically by tracking and maintaining the mapping.

Because the present invention can re-construct dynamically the relationship between the logical address and physical address, the present invention has an effect that can increase the size of a volume dynamically while normal operations are being serviced by adding new disk partition(s) to the volume and re-arranging data stored in pre-existing disk partitions corresponding to a new volume configuration including new disk partition(s).

In managing the logical volume, the present invention can tune the performance of the logical volume by moving data in a busy disk partition to other un-busy disk partitions when too many accessing requests are concentrated to one specific disk partition.

The present invention can increase performance of accessing mapping information by dividing and storing mapping table information to several disk partitions and can provide service without stopping despite the malfunctioning of one of the disk partitions by duplicating and storing information of a mapping table in a neighbor disk partition.

The present invention constructs a logical volume by using a disk partition as a volume construction unit so the present invention can minimize the size of metadata, which is stored and maintained in disks. Therefore, by minimizing the size of metadata and modifying the minimum size of metadata, the present invention can increase system performance.

Also, the present invention can operate with a huge storage system and minimize initializing time such as system booting time by significantly reducing the size of the metadata which is maintained on the system memory while the system is operating.

While the present invention has been described with respect to certain preferred embodiments, it will be apparent to those skilled in the art that various changes and modifications may be made without departing from the scope of the invention as defined in the following claims.

What is claimed is:

1. A method for managing a logical volume in order to support dynamic online resizing and minimizing a size of metadata, said method comprising steps of:

a) creating the logical volume by gathering disk partitions in response to a request for creating the logical volume in a physical storage space;

b) generating the metadata including information of the logical volume and the disk partitions forming the logical volume and storing the metadata to the disk partitions forming the logical volume;

c) dynamically resizing the logical volume in response to a request for resizing, and modifying the metadata on the disk partitions forming the logical volume; and d) calculating and returning a physical address corresponding to a logical address of the logical volume by using mapping information of the metadata containing information of the physical address corresponding to the logical address;

wherein the metadata includes, a disk partition table containing information of a disk partition in which the metadata is stored;

a logical volume table for maintaining the information of the logical volume by storing duplicated information of the logical volume onto all disk partitions of the logical volume;

an extent allocation table for indicating whether each extent in the disk partition is used or not used; and a mapping table for maintaining a mapping information for a physical address space corresponding to a logical address space which is a continuous address space equal in size of storage space to an entirety of said logical volume.

2. The method as recited in claim 1, wherein the mapping table is divided into parts corresponding in number to a number of disk partitions forming the logical volume and each divided part is stored to each disk partition.

3. The method as recited in claim 1, wherein the metadata further includes a mirror data table for validating data located on several disk partitions corresponding to each mirror by maintaining the mirror data table in disk partitions constructing each mirror and storing the mirror data table to each corresponding mirror in an overlapped manner.

4. The method as recited in claim 1, wherein said disk partition table includes the logical volume information to which the disk partitions containing the metadata belong, information for identifying the disk partitions, real data start information, an extent size information of the disk partitions defined in the logical volume, and mirror checking information;

said logical volume table is duplicated and stored in all disk partitions forming the logical volume including logical volume identifying information corresponding to the logical volume, logical volume name information, extent size information of the logical volume, redundant array of independent disk (RAID) level information of construction type of the logical volume, and a total number of disk partitions forming the logical volume;

said extent allocation table represents usage of each extent by using one bit per each extent in disk partition; and said mapping table being constructed with a pair of the disk partitions identifying information and an extent number corresponding to each extent for mapping a logical address to a physical address.

5. The method as recited in claim 4, wherein the extent allocation table is duplicated and stored in the disk partition for overcoming a local error of a disk partition which contains the metadata.

6. The method as recited in claim 4, wherein the mapping table is duplicated and stored into the succeeding disk partition among disk partitions constructing a logical volume for preventing unavailability of mapping information caused by an error.

7. The method as recited in claim 4, wherein the metadata further includes a mirror data table located on disk partitions storing original data or mirror data, and the mirror data table is constructed with bits corresponding in number to the number of disk partitions having at least one mirror data or the original data per one extent for validating a corresponding extent of each corresponding disk partition.

8. A computer-readable recording medium storing instructions for executing a method for managing a logical volume in order to support dynamic online resizing and minimizing a size of metadata, said method comprising the steps of:
   a) creating the logical volume by gathering disk partitions in response to a request for creating the logical volume in a physical storage space;
   b) generating the metadata including information of the logical volume and the disk partitions forming the logical volume and storing it the metadata to the disk partitions forming the logical volume;
   c) dynamically resizing the logical volume in response to a request for resizing, and modifying the metadata on the disk partitions forming the logical volume; and
   d) calculating and returning a physical address corresponding to a logical address of the logical volume by using mapping information of the metadata containing information of the physical address corresponding to the logical address;
   wherein the metadata includes,
      a disk partition table containing information of a disk partition in which the metadata is stored;
      a logical volume table for maintaining the information of the logical volume by storing duplicated information of the logical volume onto all disk partitions of the logical volume;
      an extent allocation table for indicating whether each extent in the disk partition is used or not used; and
      a mapping table for maintaining a mapping information for a physical address space corresponding to a logical address space which is a continuous address space equal in size of storage space to an entirety of said logical volume.

9. The computer-readable recording medium storing instructions for executing a logical volume management method, as recited in claim 8, wherein
   said disk partition table includes logical volume information, information for identifying the disk partitions, real data starting information, extent size information of the disk partitions defined in the logical volume, and mirror checking information;

said logical volume table is duplicated and stored in all disk partitions forming logical volume including logical volume identifying information corresponding to the logical volume, logical volume name information, extent size information of the logical volume, redundant array of independent disk (RAID) level information of construction type of the logical volume, and a total number of disk partitions forming the logical volume;

said extent allocation table is duplicated and stored in the disk partition for resolving a local error of disk partition, which is for representing usage of each extent by using one bit per each extent in disk partition; and said mapping table is constructed with a pair of the disk partitions identifying information and an extent number corresponding to each extent for mapping a logical address to a physical address.

10. The computer-readable recording medium as recited in claim 9, wherein the mapping table is divided into parts corresponding in number to the number of disk partitions forming the logical volume and each divided part is stored to each disk partition.

11. A method for managing a logical volume in order to support dynamic online resizing and minimizing a size of metadata, said method comprising steps of:
   a) creating the logical volume by gathering disk partitions in response to a request for creating the logical volume in a physical storage space;
   b) generating the metadata including information of the logical volume and the disk partitions forming the logical volume and storing the metadata to the disk partitions forming the logical volume;
   c) dynamically resizing the logical volume in response to a request for resizing, and modifying the metadata on the disk partitions forming the logical volume; and
   d) calculating and returning a physical address corresponding to a logical address of the logical volume by using mapping information of the metadata containing information of the physical address corresponding to the logical address;
   wherein the metadata includes:
      a disk partition table including the logical volume information to which the disk partition containing the metadata belongs, information for identifying the disk partition, real data start information, an extent size information of the disk partition defined in the logical volume, and mirror checking information;
      a logical volume table duplicated and stored in all disk partitions constructing corresponding logical volume including logical volume identifying information corresponding to the logical volume, logical volume name information, extent size information of the logical volume, RAID level information of construction type of the logical volume, and total number of disk partitions constructing the logical volume;
      an extent allocation table for representing usage of the extent by using one bit per each extent in the disk partition; and
      a mapping table being constructed with a pair of the disk partition identifying information and an extent number corresponding to each extent for mapping a logical address to a physical address, for continuous logical address space of a logical volume.

12. The method as recited in claim 11, wherein the extent allocation table is duplicated and stored in the disk partition for overcoming a local error of a disk partition which contains the metadata.

13. The method as recited in claim 11, wherein the mapping table is duplicated and stored into the succeeding disk partition among disk partitions constructing a logical volume for preventing unavailability of mapping information caused by an error.

14. The method as recited in claim 11, wherein the metadata further includes a mirror data table located on disk partitions storing original data or mirror data, and the mirror data table is constructed with bits corresponding in number to the number of disk partitions having at least one mirror data or the original data per one extent for validating a corresponding extent of each corresponding disk partition.

* * * * *